United States Patent
Walter et al.

(10) Patent No.: US 7,654,243 B2
(45) Date of Patent: Feb. 2, 2010

(54) METHOD FOR FACILITATING VAPORIZATION OF A FUEL FOR A DIESEL TYPE DIRECT-INJECTION INTERNAL-COMBUSTION ENGINE

(75) Inventors: Bruno Walter, Colombes (FR); Alain Ranini, Rueil-Malmaison (FR)

(73) Assignee: IFP, Rueil-Malmalson Cedex (FR)

( * ) Notice: Subject to any disclaimer, the term of this patent is extended or adjusted under 35 U.S.C. 154(b) by 0 days.

(21) Appl. No.: 12/037,162

(22) Filed: Feb. 26, 2008

(65) Prior Publication Data

US 2008/0202467 A1 Aug. 28, 2008

(30) Foreign Application Priority Data

Feb. 26, 2007 (FR) .................................. 07 01468

(51) Int. Cl.
F02B 47/08 (2006.01)

(52) U.S. Cl. ................... 123/295; 123/305; 123/568.14

(58) Field of Classification Search ................. 123/295, 123/305, 568.14
See application file for complete search history.

(56) References Cited

U.S. PATENT DOCUMENTS 7,021,277 B2 *  4/2006  Kuo et al. .................... 123/299

2005/0016496 A1 *  1/2005  Hitomi et al. ................ 123/305
2006/0243241 A1 * 11/2006  Kuo et al. .................... 123/295

FOREIGN PATENT DOCUMENTS

| EP | 0 893 596 A2 | 1/1999 |
| EP | 1 300 574 A2 | 4/2003 |
| JP | 04-183945 | 6/1992 |

OTHER PUBLICATIONS

French Search Report, FR 0701468, Oct. 21, 2007.

* cited by examiner

*Primary Examiner*—Erick Solis
(74) *Attorney, Agent, or Firm*—Antonelli, Terry, Stout & Kraus, LLP.

(57) ABSTRACT

A method facilitates vaporization of a fuel in a direct-injection four-stroke engine including at least one cylinder with a combustion chamber, at least one fluid intake with an intake pipe and a valve, at least one burnt gas exhaust with an exhaust pipe and a valve, a valve controller and fuel injector. The method includes, in the vicinity of the intake phase start, in opening the intake valve so as to allow the intake fluid into the combustion chamber, in opening exhaust valve so as to feed again into this chamber at least part of the burnt gas contained in exhaust pipe; prior to the end of the intake phase, in closing the exhaust valve; in the vicinity of the intake phase end, in closing the intake valve; and during this intake phase, in carrying out at least one fuel injection into the combustion chamber.

7 Claims, 1 Drawing Sheet

METHOD FOR FACILITATING VAPORIZATION OF A FUEL FOR A DIESEL TYPE DIRECT-INJECTION INTERNAL-COMBUSTION ENGINE

FIELD OF THE INVENTION

The present invention relates to a method for facilitating vaporization of a fuel in a direct-injection internal-combustion engine with compression and self-ignition of a fuel mixture, in particular in a diesel type engine.

Advantageously, it relates to an engine that can work according to two combustion modes, a homogeneous combustion mode, in particular HCCI (Homogeneous Combustion Compressed Ignition), and a conventional combustion mode.

BACKGROUND OF THE INVENTION

The homogeneous operating mode, preferably used for low and medium engine loads, consists in injecting fuel into the combustion chamber very early (for example during the engine intake phase) so as to obtain homogeneous mixing of the fuel with a fluid such as air or a mixture of air and recirculated exhaust gas (EGR).

For the conventional combustion operating mode, preferably used at high engine loads, a fuel injection is performed around the piston compression top dead center and a conventional combustion by self-ignition, then by diffusion occurs.

With this combustion mode, it is also possible to carry out an early fuel injection referred to as "pilot" injection, at the intake phase start for example.

In the homogeneous combustion operating mode, it is advantageous for the fuel injection to occur very early in the engine running cycle in order to obtain a homogeneous mixture, but there are risks of cylinder wall wetting by the fuel injected.

Thus, a fuel injection at the start of the intake phase has the advantage of confining the fuel injected in the bowl the piston of such an engine is usually equipped with, while limiting contact of this fuel with the cylinder wall, but the temperature of the fluid contained in the combustion chamber is not high enough. It is therefore difficult for the fuel injected in this bowl, then in the combustion chamber, to vaporize.

In the conventional operating mode, the pilot injection involves the same drawbacks as regards the injected fuel vaporization difficulties as those mentioned above.

This fuel vaporization difficulty can lead to disruptions in the progress of the fuel mixture combustion and to an increase in the discharge of pollutants into the atmosphere, as well as a fuel overconsumption by the engine.

For gasoline type indirect-injection engines, it is already known to perform vaporization by injecting this fuel in liquid form or in form of fine droplets into the exhaust gas contained in the intake pipe. Upon contact with this hot gas, the fuel vaporizes to mist and mixes not only with this gas, but also with the fluid fed thereafter into the combustion chamber of the engine.

Such a transposition to direct-injection engines is impossible, essentially because fuel injection cannot take place in the intake pipe.

However, better fuel vaporization essentially has the advantage of reducing carbon oxides (CO) and unburnt hydrocarbons (HC) emissions upon combustion of the fuel mixture.

The present invention aims to overcome the aforementioned drawbacks by means of a method using the components usually present in a direct-injection engine.

SUMMARY OF THE INVENTION

The invention thus relates to a method for facilitating vaporization of a fuel in a direct-injection four-stroke internal-combustion engine that can run according to a homogeneous operating mode and to a conventional operating mode, said engine comprising at least one cylinder with a combustion chamber, at least one fluid intake means with an intake pipe and an intake valve, at least one burnt gas exhaust means with an exhaust pipe and an exhaust valve, means for controlling opening/closing of the valves and fuel injection means, characterized in that it consists:

in the vicinity of the intake phase start, in opening the intake valve so as to allow the intake fluid into the combustion chamber, in opening the exhaust valve so as to feed again into this chamber at least part of the burnt gas contained in the exhaust pipe, prior to the end of the intake phase, in closing the exhaust valve, in the vicinity of the intake phase end, in closing the intake valve, during this intake phase, in carrying out at least one fuel injection into said combustion chamber.

The method can consist in carrying out at least one fuel injection before opening the exhaust valve.

The method can consist in carrying out at least one fuel injection after opening the exhaust valve.

The method can consist in carrying out at least one fuel injection after closing the exhaust valve.

The method can consist in carrying out successive exhaust valve opening and closing cycles as the exhaust gas is re-introduced into the combustion chamber.

The method can consist, in the vicinity of the start of the engine intake phase, in opening the exhaust valve before the intake valve.

The method can consist, in the vicinity of the start of the engine intake phase, in opening the exhaust valve simultaneously with the intake valve.

The means controlling at least the exhaust valve can allow to vary the lift law of said valve.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
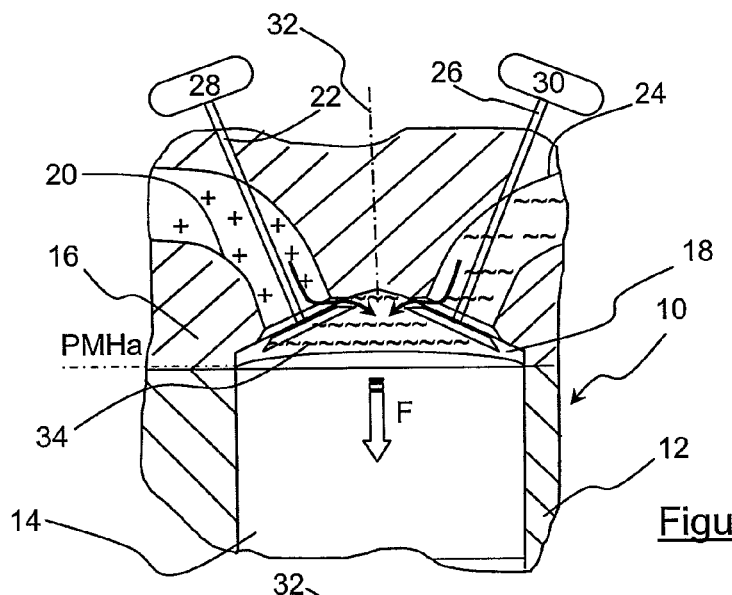
FIGS. 1 to 3 are diagrams of a direct-injection engine illustrating the progress of the various stages of the method according to the invention.
Figure 2:
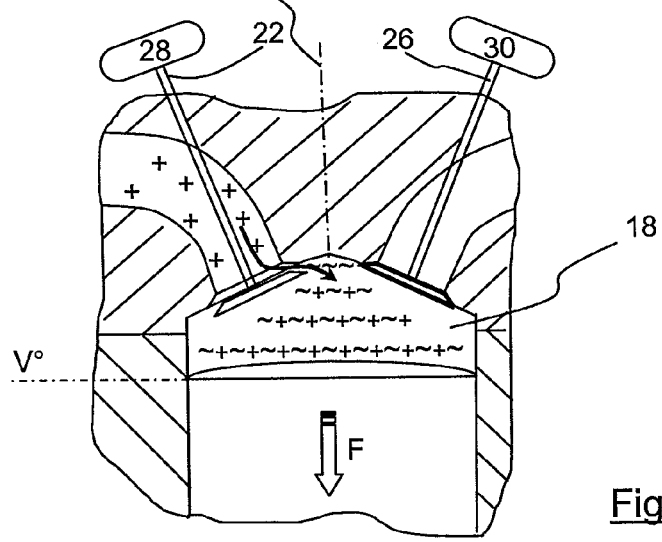
Figure 3:
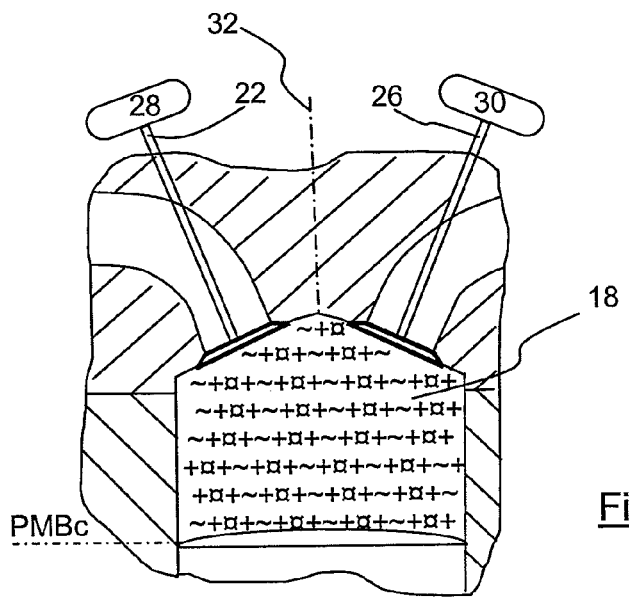

In FIGS. 1 to 3, the internal-combustion engine shown is a direct-injection four-stroke (or four-cycle) internal-combustion engine that can run according to two combustion modes, a homogeneous combustion mode, in particular HCCI (Homogeneous Combustion Compressed Ignition), and a conventional combustion mode.

The homogeneous operating mode, used for low and medium engine loads, consists in injecting fuel into the combustion chamber very early (during the engine intake phase for example) so as to obtain homogeneous mixing of the fuel with a fluid such as air or a mixture of air and recirculated exhaust gas (EGR).

For the conventional combustion mode, preferably used at high engine loads, a fuel injection is carried out around the compression top dead center of the piston and a conventional combustion by self-ignition, then by diffusion occurs. It is also possible to perform an early fuel injection referred to as "pilot" injection, for example at the intake phase start.

This engine comprises at least one cylinder 10 with a cylinder body 12 within which a piston 14 slides in a rectilinear reciprocating motion under the effect of a rod controlled by a crankshaft (not shown). The cylinder body is closed, in the upper part, by a cylinder head 16 thus delimiting a combustion chamber 18 consisting of the lateral wall of the cylinder body, the cylinder head and the upper part of the piston.

What is referred to as the combustion chamber is the volume defined above plus the volume made up of a possible hollow bowl housed at the top of the piston.

The cylinder head carries at least one intake means with an intake pipe 20 whose opening into the combustion chamber is controlled by an intake valve 22. The cylinder head also carries at least one exhaust means with an exhaust pipe 24 whose communication with the combustion chamber is controlled by an exhaust valve 26.

Opening/closing of the intake and/or exhaust valves is controlled by means 28 and 30 allowing to vary the lift laws of these valves, as regards their opening/closing time as well as their lifts, independently of one another or in combination. These means are better known as VVT (Variable Valve Timing), VVL (Variable Valve Lift) or VVA (Variable Valve Actuation).

It is also possible to control this exhaust valve and possibly the intake valve with control means referred to as "camless", i.e. with no camshafts. In this case, the engine comprises an actuating means dedicated to each valve, such as an electromagnetic or hydraulic or electrohydraulic or pneumatic or electropneumatic control actuator that directly or indirectly acts upon the valve rod.

In the example described in connection with FIGS. 1 to 3, opening/closing of intake valve 22 is controlled by conventional means 28 such as a camshaft, whereas exhaust valve 26 is controlled by means 30 allowing to vary its lift law, in particular with VVA type means.

The engine also comprises fuel injection means 32, preferably in form of a multijet injection nozzle (shown in the figure by an axis line), which spray fuel into combustion chamber 18 so as to obtain a fuel mixture with the fluid contained therein.

Exhaust valve control means 30 and fuel injection means 32 are controlled by a calculating unit (not shown) commonly referred to as engine calculator, which an engine is usually equipped with. Of course, if intake valve control means 30 are camless type means or of the type allowing the lift laws of these valves to be varied, the calculator also controls these control means.

The purpose of this calculator is notably to control opening/closing of the valves, as well as the nozzle injection parameters, such as the injection time during the engine cycle, the fuel injection duration, . . . .

The description of the method hereafter is given in connection with the engine of FIGS. 1 to 3.

FIG. 1 shows the configuration of the direct-injection engine after the end of the exhaust phase of this engine and at the start of its intake phase. In this configuration, piston 14 is at its intake top dead center (PMHa), combustion chamber 18 contains burnt gas 34 (or exhaust gas), the exhaust pipe only contains burnt gas and the intake pipe contains intake fluid.

From this PMHa position, piston 14 is driven under the effect of the rod and the crankshaft for an intake phase wherein it follows a vertical downward motion (arrow F in FIGS. 1 and 2) starting from its intake top dead center PMHa towards its compression bottom dead center (PMBc in FIG. 3).

In the vicinity of PMHa, the calculator controls control means 30 in such a way that exhaust valve 26 is in an open position while intake valve 22 is conventionally opened under the action of camshaft 28. In this position and under the effect of the motion of piston 14, burnt gas 34 contained in exhaust pipe 24 and the fluid contained in the intake pipe are fed into combustion chamber 18.

The calculator also controls, during this intake phase, at least one fuel injection into the combustion chamber by means of injection nozzle 32.

Advantageously, according to the example described, at least one fuel injection is carried out in the mixture of fluid admitted and of burnt gas re-introduced into the combustion chamber before closing of the exhaust valve. This fuel injection in the hot fluid/burnt gas mixture has the effect of vaporizing this fuel upon contact with this mixture while significantly reducing contact between the liquid fuel and the cylinder wall.

Of course, without departing from the scope of the invention, this injection can occur before opening of the exhaust valve so as to perform vaporization of this fuel with the residual burnt gas usually present in the dead volume of the combustion chamber, then to continue this vaporization during introduction of the burnt gas contained in the exhaust pipe.

Also, the fuel injected can be contacted with the mixture of fluid admitted and of burnt gas re-introduced into the combustion chamber after closing of the exhaust valve to provide vaporization of this fuel.

Advantageously, at the start of the intake phase, exhaust valve 26 opens before opening of intake valve 22 as soon as allowed by the piston/cylinder head distance, more precisely the distance between the bottom of the piston recesses and the corresponding surface on the valve. This exhaust valve then closes at point V°. Opening of the intake valve can be considered very shortly after opening of the exhaust valve or quasi-simultaneously with the closing of the exhaust valve at point V°. Of course, any other configuration between these two valves can be considered, such as simultaneous opening thereof at the intake phase start.

After a limited displacement of piston 14 that corresponds to some ten degrees of crank rotation angle (V° in FIG. 2) from PMHa, the calculator controls closing of exhaust valve 26, intake valve 22 conventionally remains in its open position and the fluid continues to be fed into combustion chamber 18 to be mixed with the carburetted feed. The injection nozzle can continue its fuel injection(s) into the combustion chamber during all or part of the descending motion of this piston. Upon contact with this feed mixed with the intake fluid, the injected fuel can thus vaporize better under the effect of the temperature of the feed contained in the chamber, and the homogeneity of the fuel mixture obtained is greatly improved.

At the end of this intake phase, piston 14 is in the vicinity of the compression bottom dead center PMBc (FIG. 3), intake valve 22 is in the closed position under the effect of camshaft 28.

The mixture obtained in chamber 18 upon closing of intake valve 22 in the vicinity of the end of the intake phase therefore is a fluid/vaporized fuel mixture that contains a certain amount of burnt gas.

As it is known, the engine operating method continues with a fuel mixture compression phase and the possibility of continuing the fuel injections and combustion.

During the intake phase with opening of the exhaust valve as described above, it is possible to inject the fuel as the burnt gas is fed into the combustion chamber.

It is also possible to carry out a succession of exhaust valve opening/closing cycles associated with a fuel injection until the programmed closing at V° of this valve. This has the effect of minimizing the local temperature drop of the burnt gas when the calories contained therein are used for vaporizing the fuel injected into the combustion chamber.

Of course, the person skilled in the art will control closing of the exhaust valve at V° in the engine intake phase in such a way that the amount of burnt gas present in the combustion chamber at the end of this phase does not alter the fuel mixture combustion by compression and self-ignition.

The present invention is not limited to the embodiment examples described above and it encompasses any variant and equivalent.

Notably, the method described can be used with then engine as described in French patents No. 2,818,324 and 2,818,325 filed by the applicant, comprising at least a cylinder, a piston sliding in this cylinder, a combustion chamber delimited on one side by the upper face of the piston comprising a teat arranged at the centre of a concave bowl with a bottom wall connecting the base of the teat and the peripheral wall of this bowl. The engine also comprises an injection nozzle for injecting fuel with a nappe angle smaller than or equal to $$2 Arctg \frac{CD}{2F},$$

where CD is the diameter of the cylinder and F the distance between the point of origin of the fuel jets from the injection nozzle and the piston position corresponding to a crank angle of 50° with respect to the top dead center.

The invention claimed is:

1. A method for facilitating vaporization of a fuel in a direct-injection four-stroke internal-combustion engine that can run according to a homogeneous operating mode and to a conventional operating mode, the engine comprising at least one cylinder with a combustion chamber, at least one fluid intake means with an intake pipe and an intake valve, at least one burnt gas exhaust means with an exhaust pipe and an exhaust valve, valve opening/closing control means and fuel injection means, comprising:

in the vicinity of the intake phase start, opening the exhaust valve so as to feed again into the combustion chamber at least part of the burnt gas contained in the exhaust pipe, and then, in the vicinity of the intake phase start and after opening the exhaust valve, opening the intake valve so as to allow the intake fluid into the combustion chamber, prior to the end of the intake phase, closing the exhaust valve, in the vicinity of the intake phase end, closing the intake valve, and during the intake phase, carrying out at least one fuel injection into said combustion chamber.

2. A method as claimed in claim 1, further comprising carrying out at least one fuel injection before opening the exhaust valve.

3. A method as claimed in claim 1, further comprising carrying out at least one fuel injection after opening the exhaust valve.

4. A method as claimed in claim 1, further comprising carrying out at least one fuel injection after closing the exhaust valve.

5. A method as claimed claim 1, further comprising carrying out successive cycles of opening and closing the exhaust valve as the exhaust gas is re-introduced into the combustion chamber.

6. A method as claimed in claim 1, further comprising controlling at least the exhaust valve to vary the lift law of the exhaust valve.

7. A method as claimed in claim 2, further comprising carrying out at least one fuel injection after opening the exhaust valve.

\* \* \* \* \*